(12) United States Patent
Kaizuka

(10) Patent No.: US 7,702,056 B2
(45) Date of Patent: Apr. 20, 2010

(54) TIME BASE CORRECTOR

(75) Inventor: Masao Kaizuka, San Jose, CA (US)

(73) Assignee: Toshiba America Electronic Components, Inc., Irvine, CA (US)

( * ) Notice: Subject to any disclaimer, the term of this patent is extended or adjusted under 35 U.S.C. 154(b) by 828 days.

(21) Appl. No.: 11/553,320

(22) Filed: Oct. 26, 2006

(65) Prior Publication Data

US 2008/0101518 A1 May 1, 2008

(51) Int. Cl.
*H04L 7/00* (2006.01)
*H04N 7/12* (2006.01)
*H03L 7/00* (2006.01)

(52) U.S. Cl. ................. 375/371; 375/240.28; 348/537

(58) Field of Classification Search ................ 375/354, 375/359, 362, 371, 373, 375, 224, 226, 238, 375/240.01, 240.26, 240.28; 348/497, 500, 348/512, 515, 536, 537; 704/200, 201, 226; 370/464, 498, 503, 507, 508, 509, 514, 516–519

See application file for complete search history.

(56) References Cited

U.S. PATENT DOCUMENTS

| | | | |
|---|---|---|---|
| 6,175,385 B1 | 1/2001 | Kohiyama et al. | |
| 6,233,238 B1 | 5/2001 | Romanowski et al. | |
| 6,754,296 B2 | 6/2004 | Schulz et al. | |
| 6,917,247 B2 | 7/2005 | Schoner | |
| 2003/0035485 A1* | 2/2003 | Honmura et al. | 375/240.25 |
| 2006/0078057 A1* | 4/2006 | Yoshida | 375/240.28 |
| 2006/0184474 A1 | 8/2006 | Hatano et al. | |
| 2006/0209989 A1* | 9/2006 | Saha et al. | 375/326 |

FOREIGN PATENT DOCUMENTS

WO    WO 02/25952 A2    3/2002

OTHER PUBLICATIONS

Pandya, Application Note—AN101 Considerations for Measurement of PCR Jitter, pp. 1-2, Copyright © 2001 Pixelmetrix Corporation.

* cited by examiner

*Primary Examiner*—David C Payne
*Assistant Examiner*—Vineeta S Panwalkar
(74) *Attorney, Agent, or Firm*—Tucker Ellis & West LLP

(57) ABSTRACT

A system and method for synchronizing a system clock in accordance with a program clock reference of a content data stream includes application of incremental delays to a local clock signal having a higher frequency than that specified by the program clock reference. The delay is made over a period defined by phase comparison between a system clock signal and a minimum delay value. Delay values are incremented proportionally to a number of clock cycles over the period. The subject system allows for display of jitter free audio or video decoded from the content data stream, and is realized in circuitry that is readily implement on an integrated circuit.

12 Claims, 11 Drawing Sheets

*Figure 8*

TIME BASE CORRECTOR

BACKGROUND OF THE INVENTION

This application pertains to synchronizing a clock to values disposed in a digital data stream. It is particularly applicable to generating a local clock that corresponds to a program clock reference embedded in the data stream. However, it will be appreciated that the subject application is applicable to any system in which a local clock is to be synchronized in accordance with received input values.

Several standards have been propagated relative to compression, transmission, and decompression of encoded video data, encoded audio data, or combinations thereof. A current specification for transmission is promulgated by the International Organization for Standards ("ISO"), in the published MPEG-4 specifications. MPEG-4 is an updated and expanded transmission standard that follows the earlier MPEG-2 standard. Specifications, such as MPEG-4, allow for uniform encoding, transmission and decoding of digital information. When digitally encoded information is retrieved, a synchronous, digital device is used to decode the information and display a real time audio or video output, such as, via a speaker and video display.

Moving images, such as with video feeds, as well as audio, must be delivered in real time and in an ordered presentation. Failure to do this accurately will result in a loss of image integrity, and a degradation of an illusion of fluid motion or movement, the latter of which is sometimes referred to as "jitter." There are problems that are inherent in any data transmission, including delays associated with coding, multiplexing of signals, and transmission or propagation delays. It is important that data be received and buffered, and ultimately decoded then displayed in a manner sufficiently synchronized with the properties of the original data so as to address any such concerns, and provide a smooth, uninterrupted and jitter-free playback. Such playback is also accomplished by use of timing generated by a local data clock, which clock will generally not be exactly the same as that used in the original encoding and transmission of a content stream.

It is important that timing of decoding and display of such audio visual information be synchronized properly with an incoming MPEG-4 specifications include IEC13818-1, which specification details incorporation of a program clock reference ("PCR") data field into a data stream. This data is used on a receiving end of a stream to facilitate time recovery and pulse synchronization. Any action upon a data stream necessitates an updating of a PCR value. Such changes in a data stream may be attributed to variations in data rate, change in data sequence, addition of multiple program transport streams, and the like.

Failure to properly correct a local-generated clock signal to be synchronized with that found in an incoming data stream will result in loss of picture, loss of audio, jitter or offset associated with a subsequent decoding and display thereof.

Currently, systems exist which allow for capturing of a PCR value, which value is used to determine whether a local clock signal is too fast or too slow. Appropriate adjustment of the local clock signal in accordance with this PCR value is then made. While conventional systems are effective, they typically take advantage of hardware, such as pulse width modulation generators, low pass filters and voltage controlled crystal oscillators, which devices work in tandem to provide adjustment to a local clock signal in accordance with a PCR value. While functional, inclusion of a voltage controlled crystal oscillator and low pass filtering typically requires that components be used which are not easily integrated into an integrated circuit die. Thus, additional expense, size, components, interconnections and assembly time are required to generate a circuit capable of generating an acceptable, synchronized clock value.

It will be advantageous to have a system and method for adjusting a local clock value in accordance with an incoming PCR value, which system could be effective in and integrated onto an LSI device, together with other hardware and software associated with decoding of an incoming stream.

SUMMARY OF THE INVENTION

In accordance with the subject application, there is provided a system and method for synchronizing a clock to values disposed in a digital data stream.

Further, in accordance with the subject application, there is provided a system and method for generating a local clock that corresponds to a program clock reference embedded in a digital data stream.

Still further, in accordance with the subject application, there is provided a system and method for adjusting a local clock value in accordance with an incoming PCR value, which system could be effective in and integrated onto an LSI device, together with other hardware and software associated with decoding of an incoming stream.

Still further, in accordance with the subject application, there is provided time base corrector system. The system includes means adapted for receiving an input data stream, which input data stream includes program clock reference data corresponding to a content frequency associated with streaming content data. The system also includes means adapted for receiving system clock data associated with a system clock signal and comparison means adapted for generating a comparison signal in accordance with received program clock reference data and received system clock data. The system further comprises means adapted for generating a delay signal in accordance with a generated comparison signal and means adapted for generating a phase signal representative of relative phase of the system clock signal and a minimum delay value. The system further includes means adapted for calculating a correction interval in accordance with a generated phase signal, means adapted for calculating a delay increment in accordance with a calculated correction interval, and delay means adapted for applying a calculated delay increment to an input clock signal over the correction interval to generate the system clock signal therefrom.

Still further, in accordance with the subject application, there is provided a time based correction method in accordance with the above described system.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and description will be regarded as illustrative in nature and not as restrictive.

BRIEF DESCRIPTION OF THE DRAWINGS

The subject application is described with reference to certain figures, including:

FIG. 8 illustrates a truth table corresponding to the programmable delay of FIG. 7.

DETAILED DESCRIPTION OF THE PREFERRED EMBODIMENT

Figure 1A:
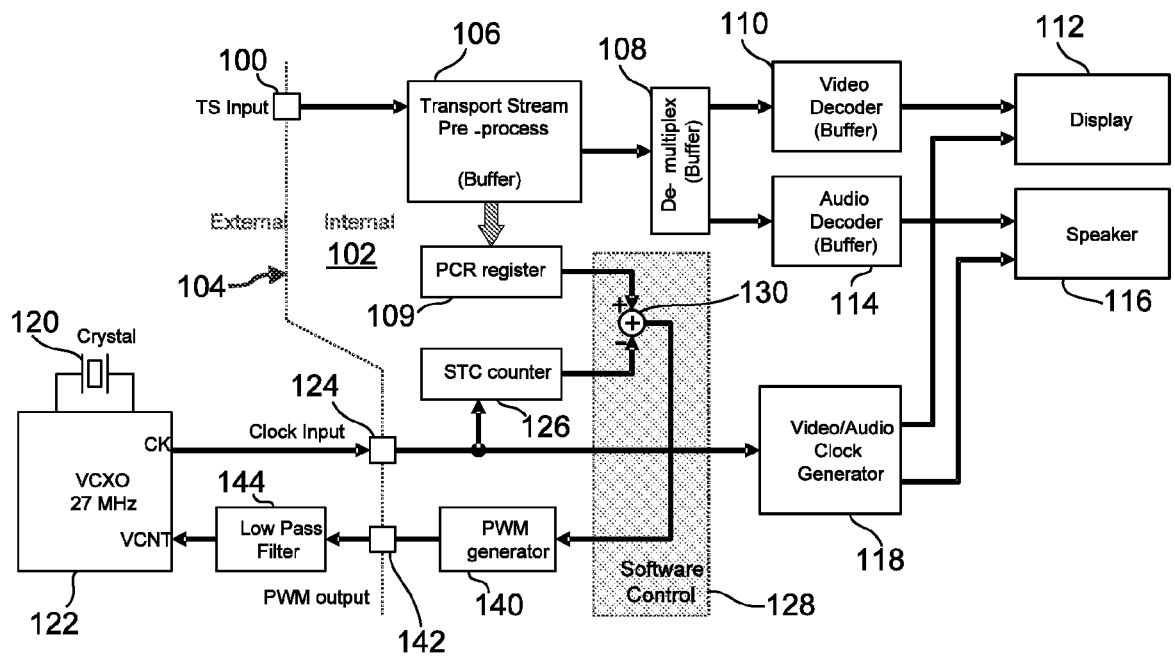
FIG. 1 illustrates a clock synchronization system of the subject application used in conjunction with decoding and displaying of content relative to a conventional system.

Turning now to the drawings, wherein the depictions are for the purpose of illustrating the preferred embodiment, FIG. 1 illustrates the time base correction system of the subject application. FIG. 1(a) illustrates a conventional approach to receipt of an encoded data stream, followed by an output of video and audio extracted therefrom in connection with a program clock reference embedded in the data stream. As will be better understood below, the subject system advantageously completes its time base correction while incorporating circuitry that is amenable to incorporation on to an integrated circuit package, eliminating costly and inefficient components that must be accomplished separately.

FIG. 1(a) illustrates input of a data transport stream at TS input 100. Such input is suitably inclusive of encoded audio, encoded video, or a combination thereof. Also included in the data transport stream is data representative of a program clock reference. While the preferred embodiment is directed to transport of audio/visual information such as in a MPEG data stream, it will be appreciated that such data transport stream is suitably comprised of any input for which synchronous decoding is advantageously used. In the illustration, TS input 100 is a signal ingress point into a semiconductor substrate 102, illustrated generally by a boundary region 104. Thus, components as detailed below are disposed on chip or off chip as illustrated relative to their position on the boundary 104.

An input data stream is received into a transport stream pre-processor 106, which extracts data representative of the program clock reference, which extracted value is stored in PCR register 109. PCR Register 109 in turn outputs a digital value corresponding to the program clock reference stored therein. Content data is routed from pre-processor 106 to a de-multiplexer 108, which de-multiplexer suitably buffers and separates audio from video, when both are encoded, communicating a video portion to a video decoder 110, which decodes and buffers a video portion, suitably communicating it to a display 112 to facilitate a video output thereon. Analogously, de-multiplexer 108 communicates an audio portion of a received transport stream to an audio decoder 114. Audio decoder 114 decodes and buffers an audio portion, suitably communicating it to an audio output device, such as speaker 116.

As noted above, it is important that such display of audio or video be closely matched to a clock signal associated with the encoding and transmission of a stream. Such a clock signal is communicated to display 112 and speaker 116 from a clock generator 118, suitably generating a clock signal that is usable for both audio aspects and video aspects of decoding. Generation of such clock signal is completed in connection with content of the PCR register 109, described above.

Generation of a clock signal via clock generator 118 commences with a crystal 120, a signal from which forms an input to a voltage controlled crystal oscillator ("VXCO") 122. In a typical MPEG-4 implementation, a suitable oscillation frequency is 27 MHz. However, it will be appreciated that in reality, there will be some deviation from a precisely set clock frequency due to inherent variations in physical properties of real world devices and slight variations in manufacturing.

A clock output from CLK from VCXO 122 is based on the both a frequency of the crystal 120, as well as an input from input VCNT, which input signal will be described in more detail below. The clock input from CLK is communicated to circuitry on the semiconductor substrate 102 via input terminal 124. From terminal 124, the value CLK is communicated to a system timing control counter 126 which outputs a digital value corresponding to cycles of CLK that are counted.

Digital values of both PCR register 109 and STC counter 126 are compared, suitably via software control of a processor subsystem 128. In the preferred embodiment, a difference between values of PCR register 109 and STC counter 126 is computed via a summer 130 running as a routine in processor subsystem 128. In such embodiment, a value of STC counter 126 is negated, and summed with a value from PCR register 109. However, it will be appreciated that such differentiation between values is also suitably accomplished directly in hardware, such as with combinational logic or directly via an arithmetic logic unit as will be appreciated by one of ordinary skill in the art.

A digital difference signal resultant from summer 130 is communicated as in input to a pulse width modulator ("PWM") generator 140. As will be readily understood by one of ordinary skill in the art, PWM 140 will output a signal with a pulse width that corresponds to a digital input value, such as that received from summer 130.

A pulse width modulated output from PWM 140 is communicated via output terminal 142 from substrate 102. This output is communicated to an input of low pass filter 144 which allows only lower frequencies to pass through. The output of low pass filter 144 forms input to the VCNT terminal of VCXO 122.

From the forgoing circuitry, it will be noted that output CLK from VCXO 122 will be speeded up or slowed down relative to a frequency of crystal 120 in accordance with feedback derived from a program clock reference received from an input stream. The corrected clock signal value, which is input to terminal 124 of substrate 102, sets timing of video/audio clock generator 118, which generates timing inputs to both display 112 and speaker 116.

Figure 1B:
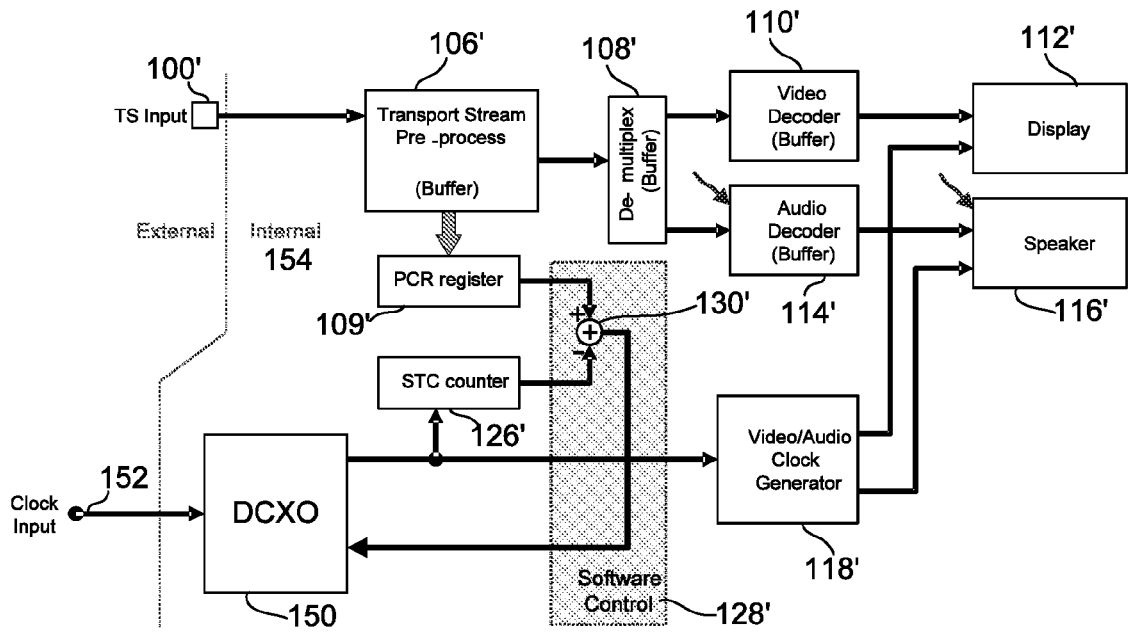

The system illustrated by FIG. 1(a), while effective, is implemented with off-chip components, evidencing problems as noted above. A comparison between the circuits of FIG. 1(a) and that taught by FIG. 1(b) illustrates an overlap in structure. Unlike the circuit of FIG. 1(a), that of FIG. 1(b) replaces VCXO 122, PWM generator 140 and low pass filter 144 with components that are readily implemented internally of a semiconductor substrate. Components of FIG. 1(b) that are analogous to those illustrated in FIG. 1(a) have been referenced with a prime, and function as disclosed above. Remaining components of FIG. 1(a) have been replaced with an on-chip implementation referred to herein as a digital controlled crystal oscillator ("DCXO"), for which interconnection with remaining components will be detailed initially, and particular construction of which will be detailed thereafter.

In FIG. 1(b), DCXO 150 is advantageously fabricated on a single, semiconductor substrate. In the preferred embodiment, DCXO 150 is formed on substrate 154, which substrate is the same on which remaining components are fabricated to allow for lowering cost and maximizing reliability. However, it will be appreciated that the digital clock control taught herein is suitably implemented on a separate substrate, multiple substrate, or in discrete components, which the functionality remaining unchanged.

As noted above, in the preferred embodiment, DCXO 150 receives a clock input from an input terminal 154, which clock input is suitably generated by any conventional clock generation circuit as will be appreciated by one of ordinary skill in the art. For the reasons detailed below, an input clock signal received at 152 is set at a frequency that does not fall below that of the finally desired clock frequency that will ultimately propagate to video/audio clock generator 118'. As will be appreciated from the description below, frequency control in DCXO 150 is such that a delay for lowering of frequency is introduced as needed and as directed from a received program clock reference value. Thus, a frequency $f_{in}$ of a clock signal received into input terminal 152 has a frequency such that $f_{in} \geq f_{out}$, which is set to be 27 MHz in the MPEG-4 embodiment.

The DCXO 150 is digital in design, therefore a digital difference value computed from values in PCR register 109' and STC counter 126' is suitably calculated directly by a summer 130' of processor subsystem 128'. Thus, the system is realized without a need to use off-substrate or analog circuitry.

Figure 2:
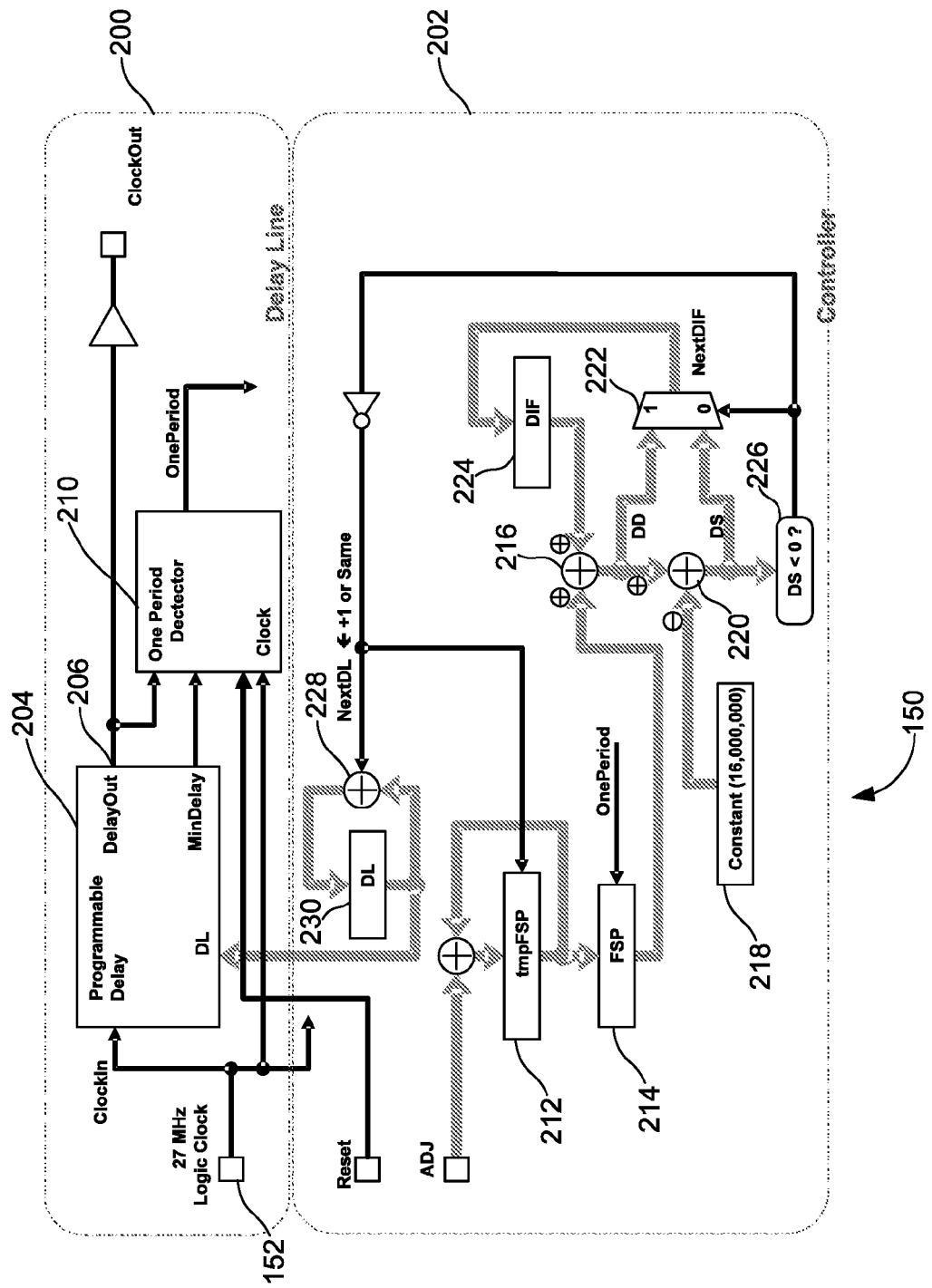
FIG. 2 illustrates a delay based clock synchronization system.

Turning now to FIG. 2, construction of the DCXO module 150 will be described in greater detail. The DCXO module 150 is illustrated inclusive of a delay line module 200 and a controller module 202. Operation of the delay line module 200 will be described first.

Delay line module 200 received input of a logic clock signal $f_{in}$, noted at input 152, which is not less than 27 MHz in the MPEG-4 embodiment. This clock forms an input to a programmable delay 204. Construction of a suitable programmable delay 204 will be detailed below. An input DL is a digital value representative of an amount of delay to be added to an input clock signal prior to it being output as DelayOut. The programmable delay 204 inherently has a minimum delay associated with it due to a finite amount of time that it takes for signal propagation, even when no additional delay is specified by the value DL. This minimum delay is output as MinDelay.

The values of DelayOut and MinDelay, output from programmable delay 204, are communicated to a phase comparator 210 that serves as a one period detector. The phase comparator 210 is synchronized to the same input clock communicated to the programmable delay 24, and is enabled for being reset upon receipt of input signal Reset. As will be detailed below, phase comparator 210 generates a signal OnePeriod representative of a period at which an edge of the input clock signal corresponds to an edge of input value DelayOut.

In operation, the programmable delay 204 is initialized and commences with a zero delay value. An imposed delay is increased gradually and constantly until a phase comparison detects a match. At this point the OnePeriod signal is asserted. This OnePeriod signal is used, in turn to restart the programmable delay lines with apportioned delay values that are imposed on the input clock among a number of cycles in a period. Thus, cycle 0 commences a gradual increase of an amount of delay. At cycle n, the system reaches a point where DelayOut matches an edge of the input clock. The system will reset the delay to a zero value, and a next edge of the input clock will appear simultaneously with a one period delay of a prior input clock signal. In an n cycle period, a value n of input clock cycles generates n−1 output clock cycles as DelayOut. Thus, more uniform application of a delay facilitates smooth audio and video playback without perceptible jitter. It will be appreciated that the subject system accomplishes synchronization with the PCR value by application of delays to the input local clock. As such the local clock is advantageously selected at a value that will, in any event, not require a speedup Turning now to the controller 202 of FIG. 2, an adjustment value ADJ is suitably received from processor module 128' (FIG. 1). In the preferred embodiment, a suitable increment number over which adjustment will be made is selected to be a 1,000,000, and, and one increment is 1 part per million PPM, over which a frequency slow-down FS will be asserted. In the illustrated embodiment an adjustment unit is made as PPM×16 so as to allow for a higher resolution, such that a constant of 16,000,000 will be used as noted below. Accumulator 212 stores a value ADJ×PDL, the value PDL being defined as a delay value set to generate a delay that corresponds to on period of an input clock. This value is stored in register 214, and is communicated to accumulator 216 which calculates a delay increment DL. Register 218 stores a constant value, selected as the 16,000,000 noted above. The value of the constant sets a number of increments over a period over which a delay value will be increased proportionately. This constant value is subtracted from an output of accumulator 216 at accumulator 220. Outputs from accumulators 216 and 220 form inputs to logic 222, yielding a value NextDIF, which is stored in register 224, which value then forms a second input to accumulator 216. A test of the value DS is made at 226, and an output is present when that value is negative, indicating that it is less than the chosen constant value in register 218. When the constant value has not yet been exceeded, an output is given to logic 222, and a negated signal is given to accumulator 212 and accumulator 228, which causes an increment in value DL stored in register 230.

In the representative embodiment of FIG. 2, it will be appreciated that a delay value DL will continue to increase incrementally until it reaches a point where a phase comparator detects a phase match. When this occurs, the value DL is the same as that PDL, and a one period signal is generated. Once one period signal is asserted, value of accumulator 212 is copied to register 214. At this point, values at registers 224 and 220 are set to zero. Thus, one clock cycle is deleted within every N clock cycles. If a constant value is chosen of 1,000,000, then N is calculated by dividing that value by value FS. Value DL is incremented such that DL=PDL when a clock count reaches N.

Where a delay program counter value DL(pc) is taken to represent a value of DL when a clock count is pc, then forgoing example is illustrated mathematically as follows:

$$DL(pc)=PDL \times pc/N; \text{ and } DL(N)=PDL$$

Where $\{N=1,000,000/FS\}$ or $\{N=16,000,000/(FS \times 16)\}$

Figure 3:
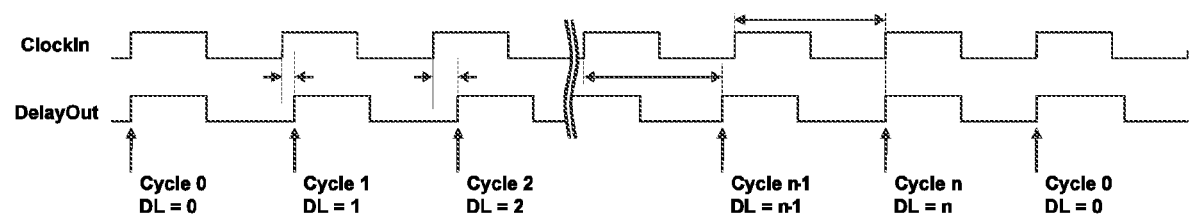
FIG. 3 illustrates application of incremental delays over an interval.

Therefore, DL(pc) $\{(PDL \times FS)/1,000,000\}$ or $\{(PDS \times FS \times 16)/16,000,000 \times PC\}$ Turning now to FIG. 3, illustrated is a waveform of ClockIn and DelayOut signals. In the illustration, when DL=n, a delay time of DelayOut relative to MinDelay is equal to one period of ClockIn.

In the illustration of FIG. 3, from cycle 0, value DL is incremented gradually with a constant rate. Thus, DelayOut will be delayed the same amount at each ClockIn, and will reach a point where DelayOut matches with a next ClockIn edge as detected by phase comparator 210 (FIG. 2). This coincidence resets DL to zero, and a next edge of ClockIn appears simultaneously with the one period delay of the previous ClockIn. Thus, in cycle n of one period, ClockIn generates n−1 of DelayOut, which forms a ClockOut. If DL reaches value n after 1 million clock countes, a frequency of the output clock is one PPM slower than the input clock. For any value FS, an input clock count is given by:

$$LX[\text{input clock count}]=1,000,000/FS$$

Figure 4:
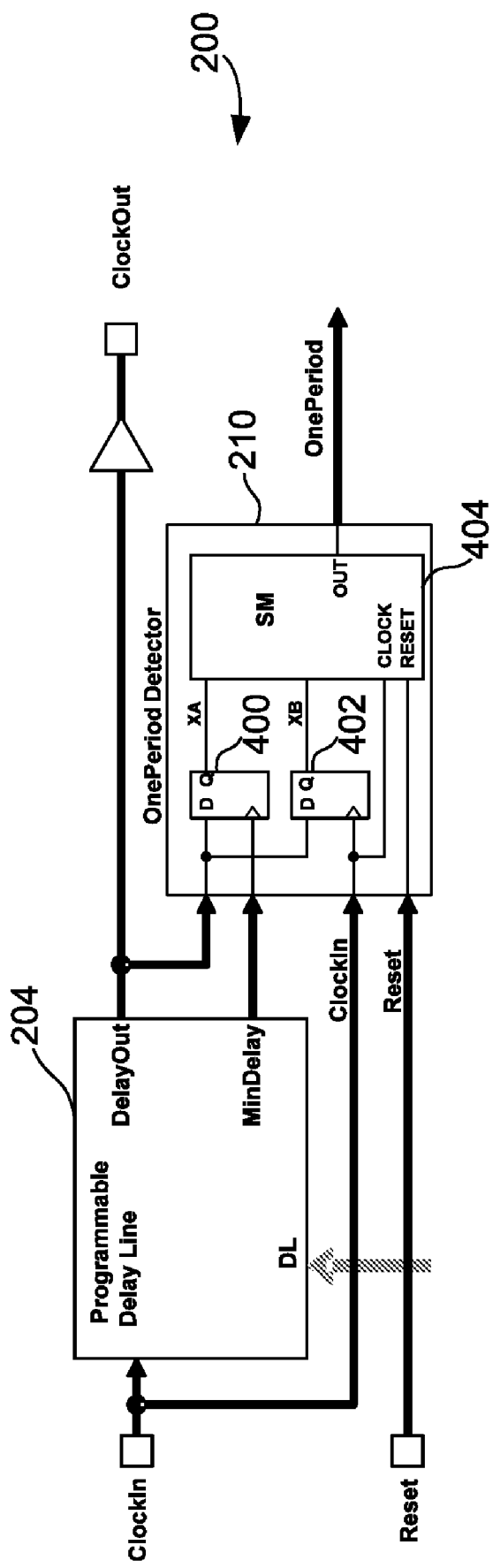
FIG. 4 illustrates in greater detail the programmable delay and phase comparator of FIG. 2.
Figure 5:
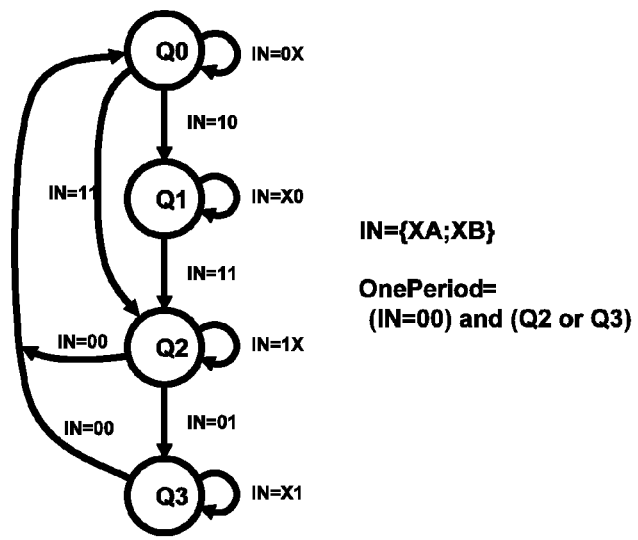
FIG. 5 is a state diagram in connection with the comparator of FIG. 4.
Figure 6:
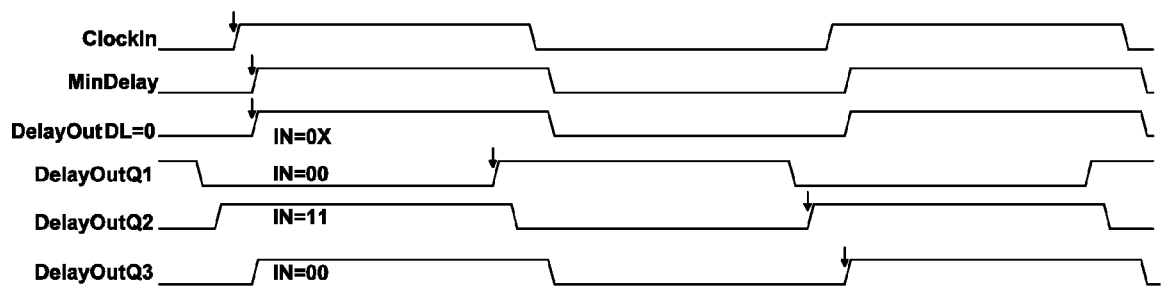
FIG. 6 a timing chart corresponding to the phase comparator of FIGS. 4 and 5.

Turning now to FIG. 4, illustrated is delay line module 200, and further detail is supplied relative to phase comparator 210, which functions as an OnePeriod Detector. Flip-flop 400 has inputs of DelayOut and MinDelay from programmable delay 204. Flip-flop 402 has inputs of DelayOut and ClockIn. Output from these flip-flops forms an input to a sequential machine 404. Output from this sequential machine forms an indication that one period has passed. FIG. 5 illustrates a state diagram of sequential machine 404, which generates the One-Period signal of FIG. 4. FIG. 6 illustrates a basic timing diagram of the sequential machine of FIGS. 4 and 5.

Figure 7:
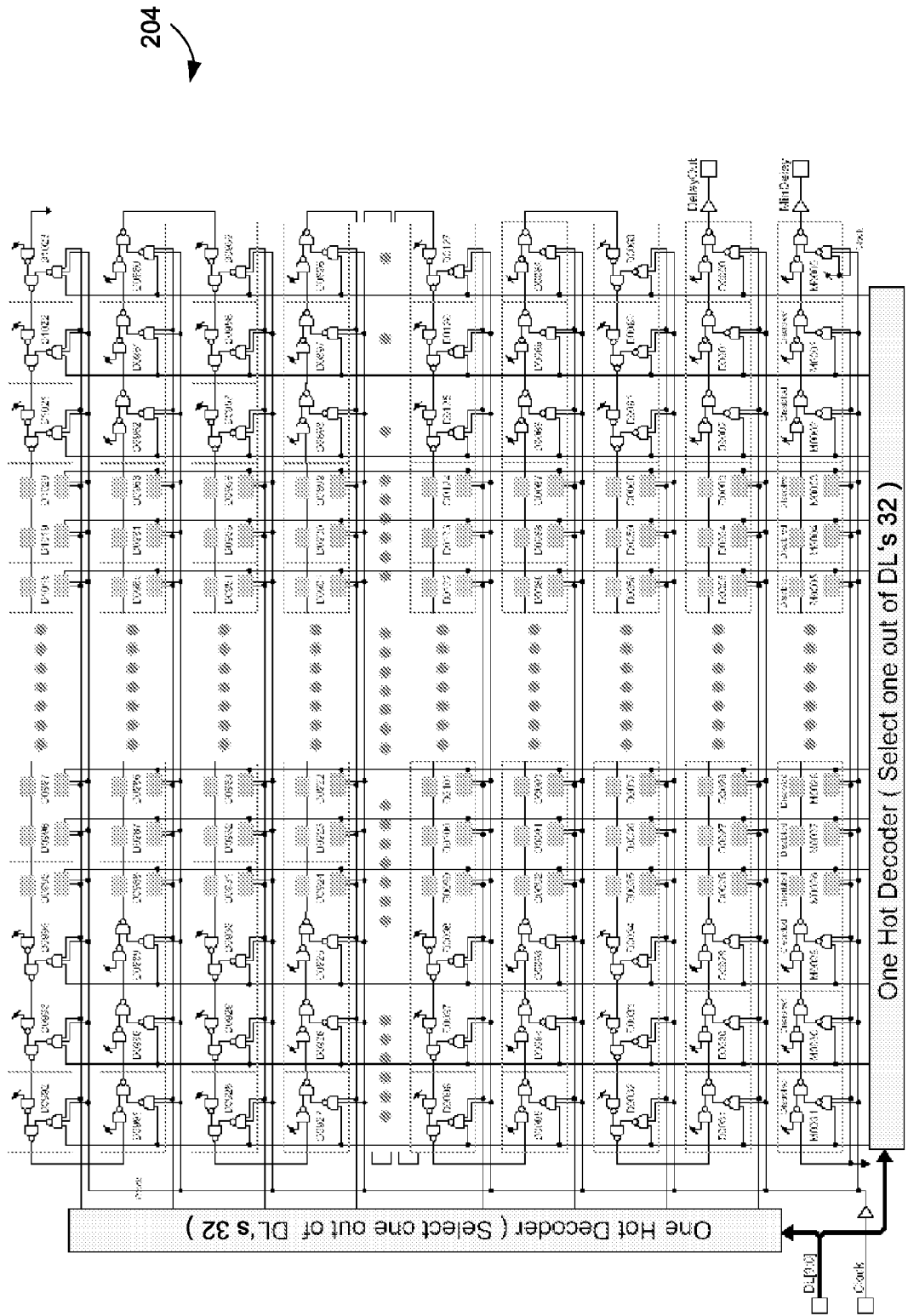
FIG. 7 illustrates a programmable delay.
Figure 7A:
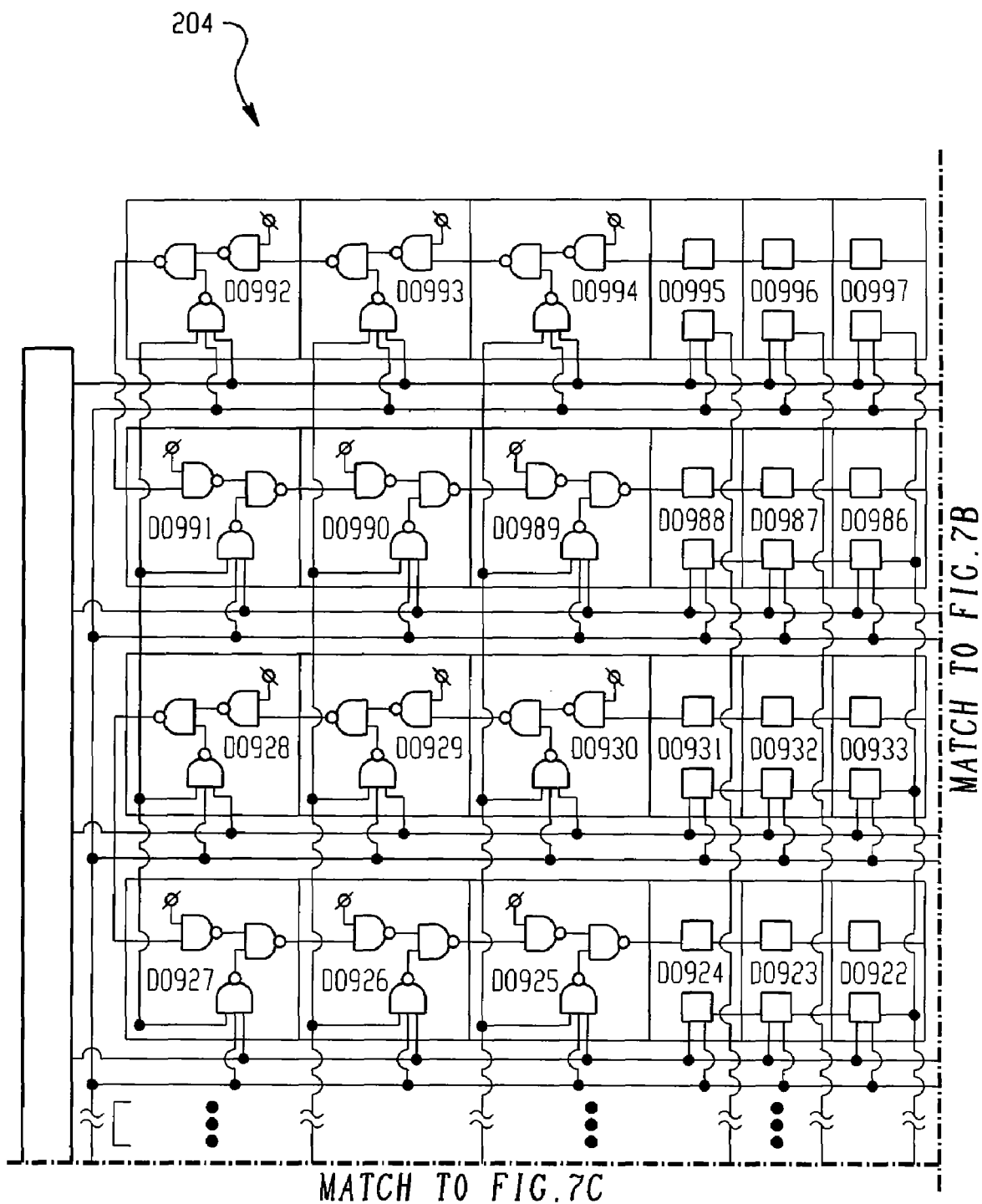
Figure 7B:
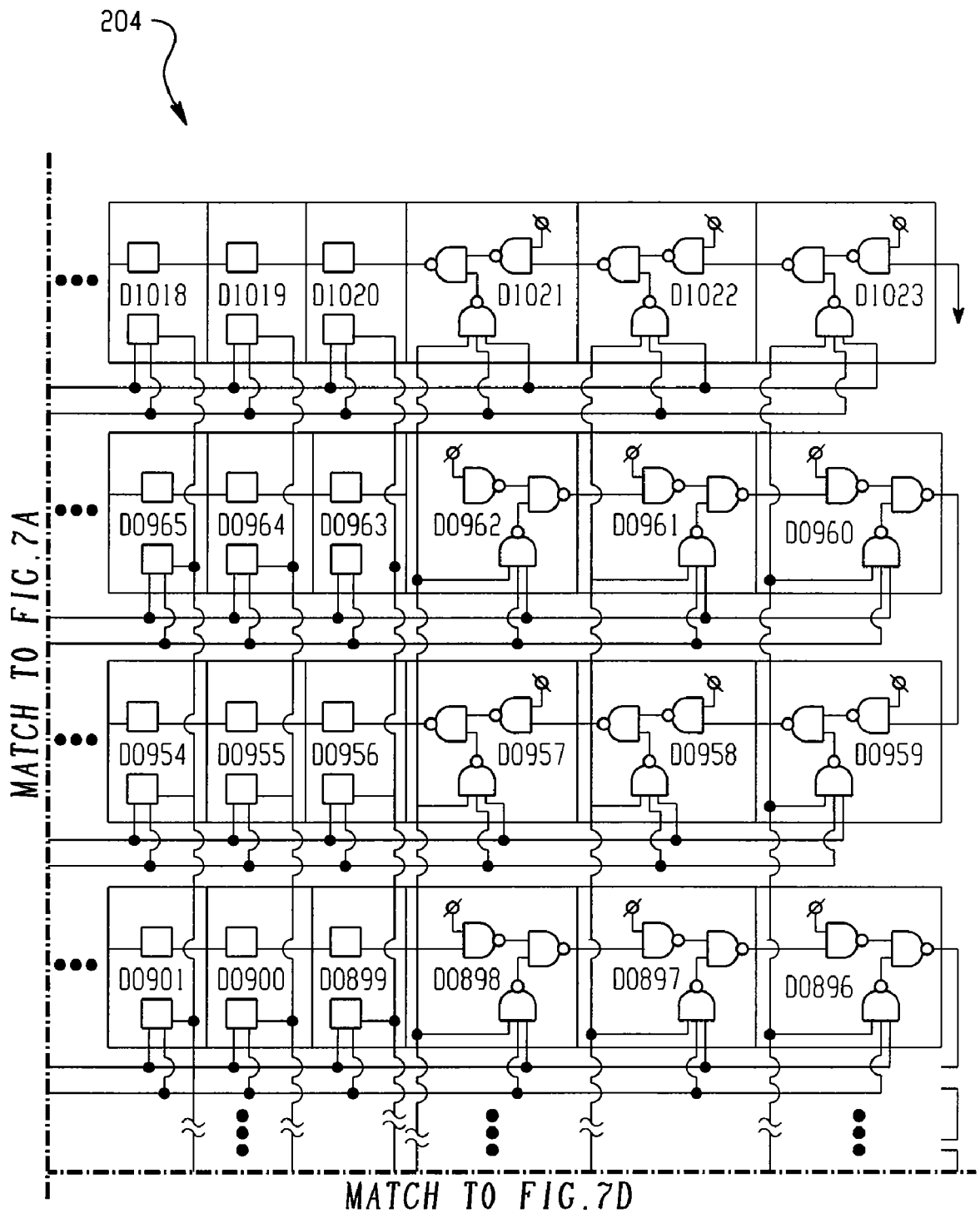
Figure 7C:
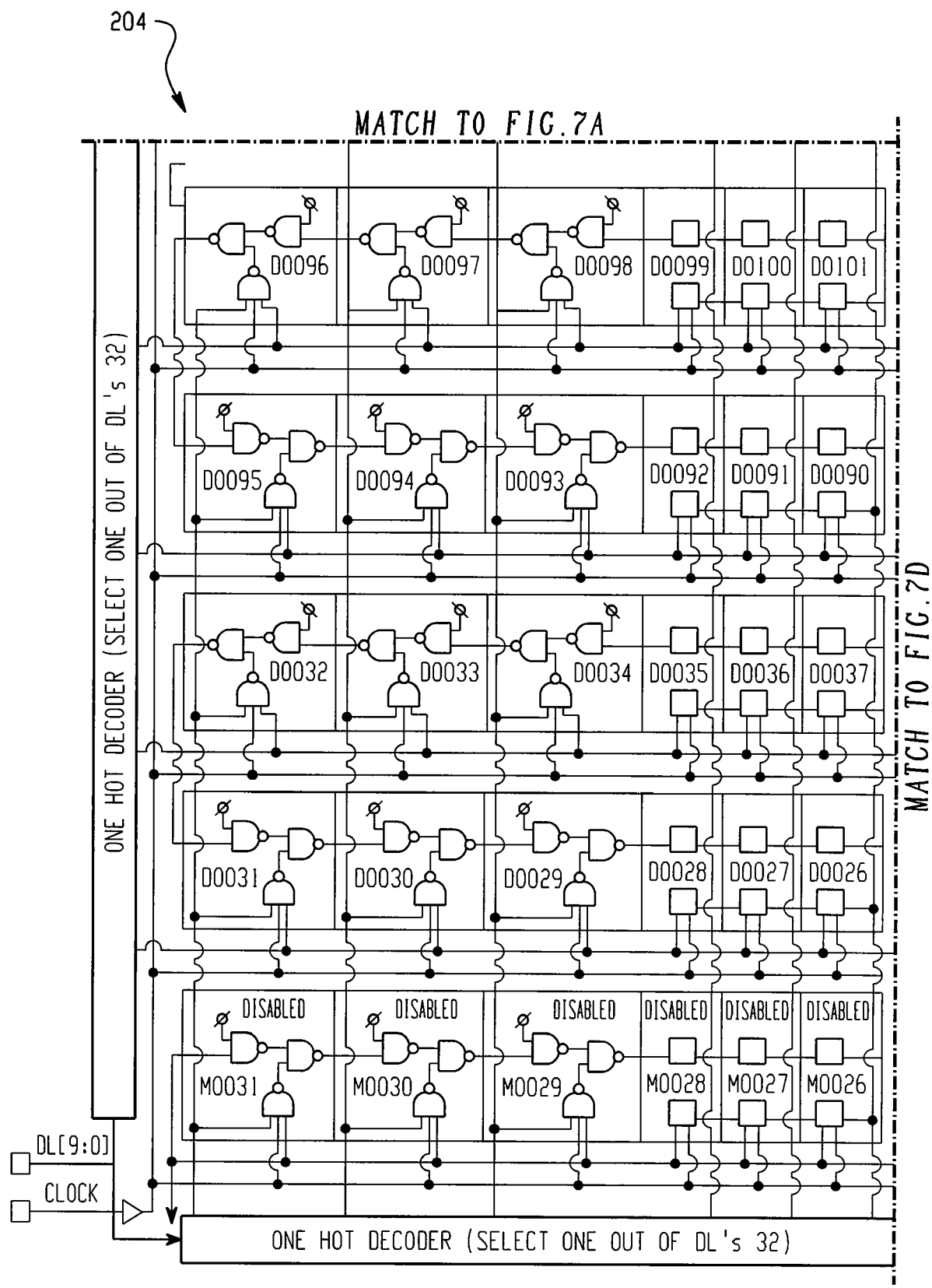
Figure 7D:
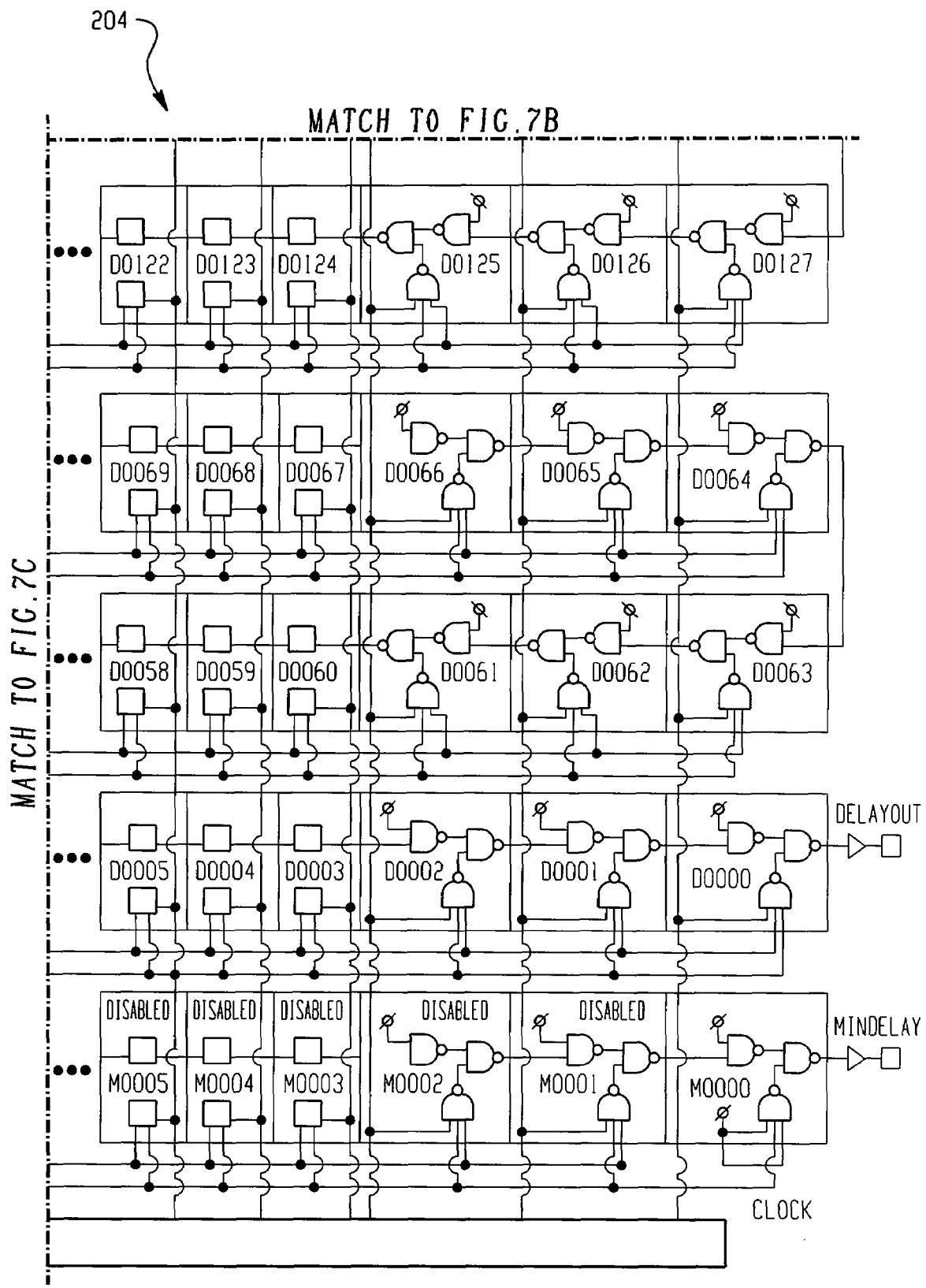
Figure 8:
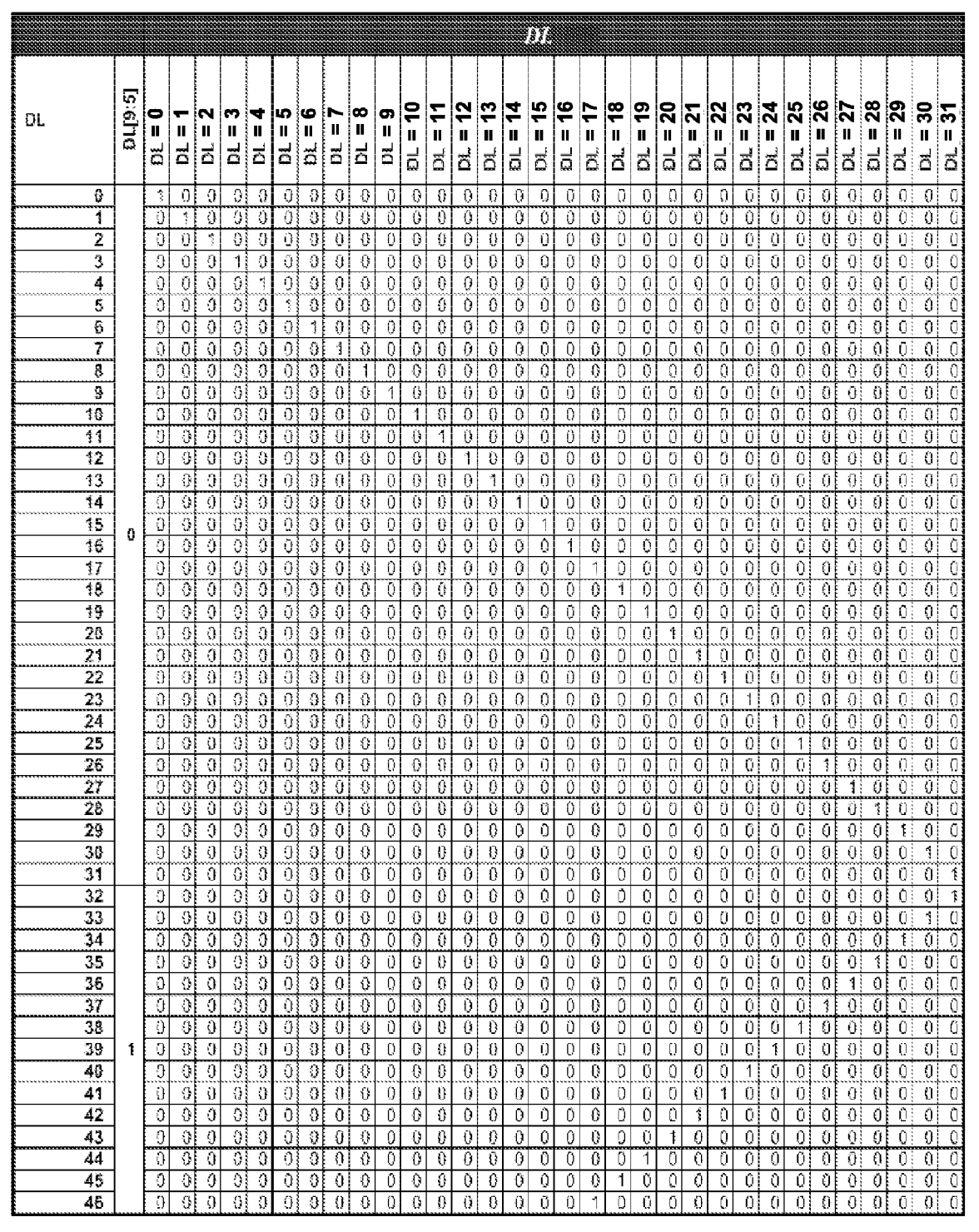

Turning next to FIG. 7, illustrated is a suitable programmable delay 204 (FIG. 2). Inputes are ClockIn and value DL, and outputs are DelayOut and MinDelay as detailed above. In the illustration of FIG. 7, programmable delay 204 has 1,024 delay+32 delay units. Of these, 1,024 are used for DelayOut and 32 are used for MinDelay, which corresponds to a minimum propagation delay associated with the illustrated circuit. For the output signal DelayOut, only one delay unit among the 1,024 is selected to gate the ClockIn signal by a decoding of value DL. When DL=0, a final delay unit which is closest to DelayOut, that is D0000, is selected. This results in the minimum delay value. For an output signal of MinDelay, the final delay unit which is closest to that value, that is M0000, is selected, An output of MinDelay is adjusted to match a delay of DelaOut with DL=0. A truth table associated with the programmable delay 204 of FIG. 7 is illustrated in FIG. 8.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A time base corrector system comprising:
   means for receiving an input data stream, which input data stream includes program clock reference data corresponding to a content frequency associated with streaming content data;
   means for receiving system clock data associated with a system clock signal;
   comparison means for generating a comparison signal in accordance with received program clock reference data and received system clock data;
   means for generating a delay signal in accordance with a generated comparison signal;
   means for generating a phase signal representative of relative phase of the system clock signal and a minimum delay value;
   means for calculating a correction interval in accordance with the generated phase signal;
   means for calculating a delay increment in accordance with a calculated correction interval; and
   delay means for applying a calculated delay increment to an input clock signal over the correction interval to generate the system clock signal therefrom.

2. The time base corrector system of claim 1 wherein the input clock signal has a greater frequency than the content frequency.

3. The time base corrector system of claim 1 wherein the delay means includes a programmable delay line, a delay of which is set by a value associated with the delay signal.

4. The time base corrector system of claim 1 further comprising means adapted for displaying decoded content data in accordance with the system clock signal.

5. The time base corrector system of claim 1 wherein the delay increment is proportional to a number of clock cycles in the correction interval.

6. The time base corrector system of claim 5 wherein the delay increment is incremented equally for each cycle of the system clock over the correction interval.

7. A time base corrector method comprising the steps of:
   receiving an input data stream, which input data stream includes program clock reference data corresponding to a content frequency associated with streaming content data;
   receiving system clock data associated with a system clock signal;
   generating a comparison signal in accordance with received program clock reference data and received system clock data;
   generating a delay signal in accordance with a generated comparison signal;
   generating a phase signal representative of relative phase of the system clock signal and a minimum delay value;
   calculating a correction interval in accordance with the generated phase signal;
   calculating a delay increment in accordance with a calculated correction interval; and
   applying a calculated delay increment to an input clock signal over the correction interval to generate the system clock signal therefrom.

8. The time base corrector method of claim 7 wherein the input clock signal has a greater frequency than the content frequency.

9. The time base corrector method of claim 7 wherein the step of applying a calculated delay increment is via a programmable delay line, a delay of which is set by a value associated with the delay signal.

10. The time base corrector method of claim 7 further comprising the step of displaying decoded content data in accordance with the system clock signal.

11. The time base corrector method of claim 7 wherein the delay increment is proportional to a number of clock cycles in the correction interval.

12. The time base corrector method of claim 11 wherein the delay increment is incremented equally for each cycle of the system clock over the correction interval.

* * * * *